United States Patent
Wenninger et al.

(10) Patent No.: US 8,713,913 B2
(45) Date of Patent: May 6, 2014

(54) METHOD FOR OPERATING A PARTICLE FILTER

(75) Inventors: Guenter Wenninger, Stuttgart (DE); Ronny Meissner, Altbach (DE)

(73) Assignee: Daimler AG, Stuttgart (DE)

( * ) Notice: Subject to any disclaimer, the term of this patent is extended or adjusted under 35 U.S.C. 154(b) by 212 days.

(21) Appl. No.: 13/501,778

(22) PCT Filed: Aug. 25, 2010

(86) PCT No.: PCT/EP2010/005200
§ 371 (c)(1),
(2), (4) Date: May 8, 2012

(87) PCT Pub. No.: WO2011/044967
PCT Pub. Date: Apr. 21, 2011

(65) Prior Publication Data
US 2013/0074476 A1     Mar. 28, 2013

(30) Foreign Application Priority Data
Oct. 16, 2009   (DE) .......................... 10 2009 049 624

(51) Int. Cl.
*F01N 3/18* (2006.01)
*F01N 3/021* (2006.01)
*F02D 41/00* (2006.01)
*F02D 41/02* (2006.01)

(52) U.S. Cl.
CPC ........ *F01N 3/021* (2013.01); *F02D 2200/0812* (2013.01); *F02D 41/0007* (2013.01); *F02D 41/0057* (2013.01); *F02D 41/029* (2013.01); *Y02T 10/40* (2013.01); *F01N 2900/0411* (2013.01); *F01N 2900/1606* (2013.01); *F01N 2430/00* (2013.01)
USPC ................... 60/274; 60/285; 60/295; 60/297; 60/311

(58) Field of Classification Search
CPC ................ F01N 2900/0411; F01N 2900/1606; F01N 2430/00; F01N 3/021; F02D 2200/0812; F02D 41/0007; F02D 41/0057; F02D 41/029; Y02T 10/40
USPC ......... 60/274, 285, 295, 297, 311; 73/114.69, 73/114.71, 114.75
See application file for complete search history.

(56) References Cited

U.S. PATENT DOCUMENTS

| | | | |
|---|---|---|---|
| 2003/0131593 | A1 | 7/2003 | Asanuma |
| 2008/0034738 | A1* | 2/2008 | Singh et al. ...................... 60/295 |
| 2010/0126145 | A1* | 5/2010 | He et al. .......................... 60/286 |
| 2011/0162352 | A1* | 7/2011 | Svensson et al. ............... 60/297 |

(Continued)

FOREIGN PATENT DOCUMENTS

| | | |
|---|---|---|
| JP | 3-10017 A | 1/1991 |
| JP | 3-10017 U | 1/1991 |

(Continued)

OTHER PUBLICATIONS

International Search Report with English translation dated Dec. 6, 2010 (four (4) pages).

(Continued)

*Primary Examiner* — Thomas Denion
*Assistant Examiner* — Jorge Leon, Jr.
(74) *Attorney, Agent, or Firm* — Crowell & Moring LLP

(57) ABSTRACT

A method for operating a particle filter that filters particles contained in the exhaust of motor vehicle combustion engines. A conditioning step is performed such that the separation efficiency of the particle filter for particles is increased relative to the value existing in the new condition.

21 Claims, 2 Drawing Sheets

(56) References Cited

FOREIGN PATENT DOCUMENTS

Figure 1:
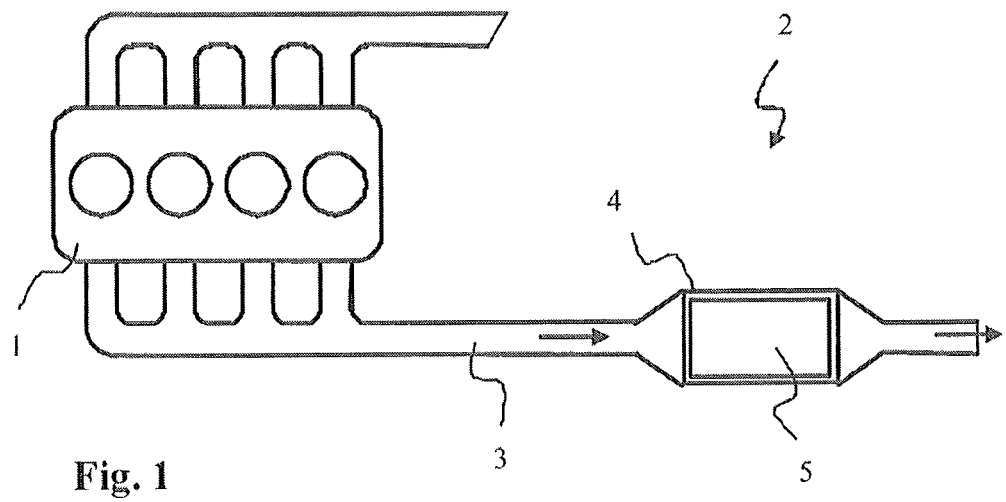

| | | |
|---|---|---|
| JP | 2001-254617 A | 9/2001 |
| JP | 2004-150330 A | 5/2004 |
| JP | 2004-245167 A | 9/2004 |
| JP | 2009-7982 A | 1/2009 |

OTHER PUBLICATIONS

Form PCT/ISA/237 (seven (7) pages).
Japanese-language Office Action dated Jun. 12, 2013 (five (5) pages).
Chinese-language Office Action with partial English translation dated Jul. 31, 2013 (14 pages).

* cited by examiner

METHOD FOR OPERATING A PARTICLE FILTER

BACKGROUND AND SUMMARY OF THE INVENTION

The invention relates to a method for operating a particle filter provided for filtering out particles contained in the exhaust of motor vehicle combustion engines.

It is customary to use particle filters for filtering out particles in the exhaust of motor vehicle combustion engines, in particular of diesel engines. Wall-flow particle filters of honeycomb structural form or sintered metal filters are frequently used. Such filters generally permit the removal of 90% or more of the particle mass or number of particles contained in the exhaust. The particles, which are present in the exhaust substantially as soot particles, are filtered out on the basis of a surface and/or depth filtration effect and over time accumulate in the particle filter. This undesirably increases the flow resistance of the particle filter, which is why the accumulated soot particles have to be removed from time to time by a regeneration operation. This is usually done by an enforced soot burn-off at an elevated temperature of typically more than 600° C. The necessity of such a regeneration operation by thermal soot burn-off is mostly carried out by monitoring the pressure drop across the particle filter or using model calculations for the particle loading of the particle filter. In particular when using a calculation model for determining the particle loading, it is disadvantageous if the behavior of the particle filter with regard to the efficiency of the filtering out of particles, i.e., the separation efficiency, changes over the period of use of the particle filter. Also, for reasons of operating reliability, a separation efficiency that changes is disadvantageous, in particular if at times it is lower than is necessary or desired.

Exemplary embodiments of the present invention are directed to a method for operating a particle filter for filtering out particles contained in the exhaust of motor vehicle combustion engines in which the aforementioned disadvantages are avoided.

In the method according to the invention for operating a particle filter provided for filtering out particles contained in the exhaust of motor vehicle combustion engines, in a new condition of the particle filter a conditioning step is performed such that the separation efficiency of the particle filter for particles is increased relative to the value existing in the new condition. As the inventors have established, in many cases the separation efficiency of a new, serviceable particle filter initially is more or less considerably less than desirable and necessary for filtering out or reducing particles at a level required in normal use. In addition, the separation efficiency proves not to be constant, but increases gradually for a new particle filter at the beginning of its period of use. This is also disadvantageous insofar as, especially at the start of the period of use, particle reduction values may fall short of those prescribed or sought. The drift over time also makes estimating the particle loading more difficult. Models intended for estimating or calculating the particle loading fail or provide inaccurate results. This makes it difficult, in particular at the beginning of the period of use, to reliably determine regeneration timings. Overall, the operation of a particle filter, owing to the phenomenon established by the inventors, especially at the beginning of its use, disadvantageously proves unreliable and difficult to calculate. These problems are not, or only insignificantly, alleviated by the gradually occurring stabilization with regard to the separation efficiency that is likewise observed. As a result of the conditioning step provided according to the invention, the disadvantageous phenomenon of a separation efficiency, which is reduced in the new condition and increases over the course of time is at least largely eliminated.

Provision is made for the conditioning step for a new, ready for use particle filter to be carried out with the operating method usually provided before the intended use thereof. Before performing the conditioning step, the manufacturing process for the particle filter is terminated and the particle filter is ready for its use in the vehicle for filtering out particles. Nevertheless, the conditioning step may succeed the manufacturing process before the particle filter starts operating. Provision is made, after the conclusion of the conditioning step, for the separation efficiency to be increased from a lower starting value to more than 70%, preferably to more than 90%, and particularly preferably to more than 97%, relative to the particle mass or the number of particles of the filtering out of particles upon the normal intended use of the particle filter. In such case, provision is made for the conditioning step to be carried out such that the separation efficiency of the particle filter after conclusion of the conditioning step upon the subsequent intended use remains substantially constant above a threshold value which is increased relative to the starting value.

The invention is advantageously applicable to open pored or closed pored filters with predominantly surface or depth filtration action. In particular, the invention is applicable to wall-flow particle filters of honeycomb structural form. With these particle filters, a flow through the porous channel walls which is forcibly brought about by end-face closure of elongate inflow channels results in a filtration effect. In a particularly advantageous manner, the invention is applicable to what are called wall-flow filter types of this type on the basis of silicon carbide, cordierite and/or aluminum titanate. However, the invention is also applicable to other filter types, such as for example foam type filters on a ceramic or metal basis or to sintered metal filters.

The conditioning step for increasing and stabilizing the separation efficiency is carried out according to the invention when the particle filters are in the new condition. A "new condition" is to be understood to mean here a state of the particle filter after conclusion of the actual manufacturing process after which the particle filter is in a serviceable form. A "new condition" is also to be understood to mean a state in which the particle filter is after conclusion of a cleaning process for removing ash deposits accumulated over the course of a relatively long period of use.

The conditioning step is carried out according to the invention for a particle filter that is in such a state before its intended use in its usual operating mode. Upon this intended use, the particle filter, in a state in which it is installed in the motor vehicle and connected to a corresponding combustion engine, filters exhaust of the engine. This has an engine-dependent and/or operating point-dependent particle content of typically 0.1 g to 3 g per km of distance traveled or approximately 1 mg to 100 mg per m$^3$ of exhaust. In this case, the particles typically have an average aerodynamic diameter of 50 nm to 120 nm for a number of approximately 10$^6$ to 10$^8$ per cm$^3$ of exhaust. In this case, solids particles are to be understood as "particles". The above-mentioned values with regard to separation efficiencies in the intended conventional use of the particle filter relate to these conditions.

In one embodiment of the invention, the conditioning step comprises passing particle-containing gas through the particle filter such that at least some of the particles contained in the gas are filtered out by the particle filter and are stored in the particle filter. Preferably the particle-containing gas substantially has particles in a size distribution as can also be found upon the intended use of the particle filter for filtering engine exhaust. In this case, provision is preferably made for the particle filter to be exposed to a gas that has a particle content that is increased relative to the value to be encountered in normal operation. The particle filter is thus operated in a particle rich special operating mode when performing the conditioning.

In a further embodiment of the invention, the conditioning step takes place when the particle filter is in the state connected to the combustion engine. The conditioning step is preferably performed before or also directly after the corresponding vehicle has been delivered to the client. In particular, provision may be made to perform the conditioning step before normal driving of the corresponding vehicle. Likewise, it is possible to perform the conditioning step following installation of a particle filter that is cleaned in a separate ash cleaning process into the exhaust system or into the vehicle. In the event that the conditioning step is performed after the vehicle has been delivered, this is preferably carried out by corresponding programming of an engine control unit. The latter is preferably programmed such that the engine operation is modified for a preset initial running distance such that the conditioning is performed.

In particular, when performing the conditioning step in the state connected to the combustion engine, in a further embodiment of the invention, upon performing the conditioning step the combustion engine is operated at least at times such that the exhaust emitted by the combustion engine has an increased particle content compared with normal operation. Preferably, the particle content of the exhaust is increased by about a factor of 1.1 to 10, particularly preferably by a factor of 1.5 to 5, relative to normal operation. In particular, in a further embodiment of the invention, upon performing the conditioning step the combustion engine is operated such that the exhaust emitted by the combustion engine has a particle content of more than 0.01 g per $m^3$ or a number of particles of more than $5 \times 10^7$ per $cm^3$ of exhaust. Thus, the conditioning step can be performed and concluded in a comparatively short time. The setting of an increased particle content in this case can be influenced in the desired manner by the number of and/or the timings of the fuel injections. Additionally or alternatively, the exhaust recirculation rate, charging pressure of a turbocharger, oil or coolant temperature can be influenced such that an increased particle content occurs in the exhaust. The start of injection of a main fuel injection is preferably retarded by about a 10 degree crank angle. The exhaust recirculation rate is preferably increased by more than 1%, particularly preferably by more than 5%. To increase the particle content, a drop in charging pressure by preferably more than 5% relative to the value normally set can be provided. Furthermore, preferably merely for performing the conditioning step, particle forming additives may be added to the fuel and/or the engine oil.

In a further embodiment of the invention, the conditioning step is performed with the particle filter connected to a conditioning device external to the vehicle. The particle filter in such case may be arranged in the exhaust system of the vehicle. The conditioning step can, however, also be carried out on a particle filter arranged outside the vehicle. For performing the conditioning step, the particle filter is connected, for example, to a liquid, gas or solids burner or to a soot generator or a particle generator, which generates a correspondingly desired size range of particles. Thus, when the vehicle is delivered or after installation of a cleaned or exchanged particle filter, a particle filter is available that already has a stably high particle separation efficiency.

In a further embodiment of the invention, particle-containing gas is passed through the particle filter for a pre-settable amount of time upon performing the conditioning step. The performance of the conditioning step is thus limited to a preset amount of time. The preset amount of time is preferably less than one hour, particularly preferably less than 20 minutes.

In a further embodiment of the invention, provision is made that upon performing the conditioning step a particle-containing gas with particles having an aerodynamic diameter of on average less than 0.1 mm is passed through the particle filter. In particular, the particle-containing gas has particles with a substantially smaller diameter than 100 nm. As was able to be demonstrated, with such a particle-containing gas a particularly effective increase in or stabilization of the separation efficiency can be achieved.

In a further embodiment of the invention, after performing the conditioning step, an amount of particles of more than 10 mg per liter of particle filter volume is filtered out from the particle filter and stored in the particle filter. It is preferred that after performing the conditioning step an amount of particles of more than 100 mg per liter of particle filter volume, particularly preferably more than 500 mg per liter, is filtered out by the particle filter and stored in the particle filter. As was able to be demonstrated, a particularly effective increase in or stabilization of the separation efficiency can thereby be achieved.

In a further embodiment of the invention, upon performing the conditioning step a particle-containing gas is used such that the particles stored in the particle filter can be substantially removed during the intended use of the particle filter. Preferably these are particles that then, when the particle filter is being used, can be removed for example by heating to preferably above 250° C. and/or by reaction with constituents contained in the engine exhaust to form volatile products. Solids particles can be used that are capable of volatilizing, for example, by sublimation. Also solids particles can be used that thermally decompose upon the intended use of the particle filter, for example under the action of an elevated temperature, the decomposition products being removable. However, the use of particles which can be removed again from the particle filter can be dispensed with if they are selected such that they do not adversely affect normal operation of the particle filter by their permanent presence in the particle filter. The particles may be formed of solids of one or more of the elements C, H, Al, Si, Ti, Fe, Cu, Pt, Pd, Ce, S, O, N, P, Zn, Ca, Na, Li, Ba, Cl, Rh, F. Initial loading of the particle filter by soot or particles similar to soot is particularly preferred.

Advantageous embodiments of the invention are illustrated in the drawings and will be described below. Therein, the abovementioned features which are still to be discussed below can be used not only in the combination of features indicated in each case, but also in other combinations or on their own, without departing from the scope of the present invention.

BRIEF DESCRIPTION OF THE DRAWING FIGURES

Figure 2:
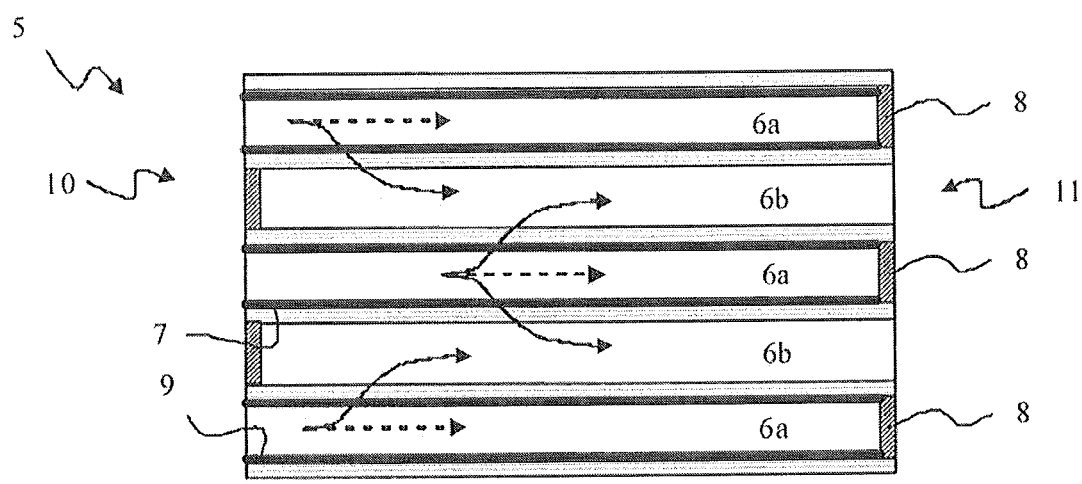
Figure 3:
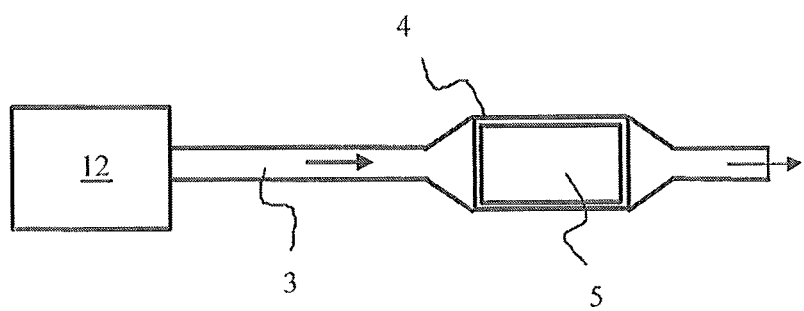

In the figures:

FIG. 1 is a diagrammatic representation of a combustion engine with connected particle filter, FIG. 2 is a diagrammatic sectional representation of a particle filter, in which preferably the method according to the invention is used, and FIG. 3 is a diagrammatic representation of a particle filter connected to a particle generator.

DETAILED DESCRIPTION

The diagrammatic representation of FIG. 1 shows a combustion engine 1 of a motor vehicle (not shown) with a connected particle filter 5. The combustion engine 1 may be, for example, of the type of a direct injection spark ignition engine capable of stoichiometric or lean burn operation or a direct injection diesel engine, which in the illustrated example has 4 cylinders. The exhaust of the combustion engine 1 is supplied via an exhaust line 3 to the particle filter 5 installed in a casing 4, which is a component of an exhaust system 2 of the combustion engine 1. For clarity, further component parts that are provided or can be provided for operating the combustion engine 1 and the exhaust system 2 are not shown. It, however, will be recognized that the exhaust system 2 may have further components, such as, for example sensors and catalysts which may precede and/or succeed the particle filter 5.

The combustion engine 1 in this case is formed such that it typically emits an exhaust with a particle content of up to 5 g per km of distance traveled by the associated motor vehicle or about 50 mg per $m^3$ of exhaust. Typically, a size distribution of the solids particles that are present substantially as soot particles is present which is at a maximum at an aerodynamic diameter of about 80 nm.

FIG. 2 shows a preferred embodiment of the particle filter 5 used, diagrammatically in longitudinal section. The particle filter 5 is formed as what is called a wall-flow particle filter with slim, straight flow channels 6a, 6b extending from an end-face entry side 10 to an opposing end-face exit side 11. In this case, only a few of a plurality of flow channels 6a, 6b are illustrated for clarity. The flow channels 6a, 6b extend parallel to one another, with adjacent flow channels being separated from each other by porous, gas permeable walls 7. The thickness of the walls 7 lies preferably in the range of 0.2 mm and 0.4 mm. The porosity preferably lies between 30% and 70%, with an average pore size of between 1 µm and 50 µm being preferred. The invention has proved particularly advantageous in particle filters with a pore size of the walls of on average 20 µm and less, and with a porosity of more than 40%. The walls 7 are preferably made of similar porosity throughout.

The flow channels 6a, 6b in the present case have a square cross-section that remains the same over its length. Other cross-sectional forms are likewise possible. In a top view (not shown) of the entry side 10 or the exit side 11, in such case an image of cells is yielded, the cell density preferably being between 100 cpsi (cells per square inch) and 400 cpsi. A cell density of approximately 300 cpsi, corresponding to approximately 47 cells per $cm^2$, is particularly preferred.

The particle filter 5 has a cylindrical form with a square cross-section, which preferably remains the same over the length. Other cross-sectional forms are of course possible. Furthermore, the particle filter 5 may also be constructed from a plurality of segments of the same type, arranged in rows and columns, corresponding to the form illustrated in FIG. 2, the segments lying against one another and preferably being joined with a ceramic adhesive.

The flow channels 6a, 6b are provided alternately on the entry side 10 and the exit side 11 with a gas impermeable plug 8. Apart from the plug 8, they are formed so that the flow can pass freely through, viewed across the rest of their axial extent. Open flow channels which are non-closed on the entry side 10 form entry channels 6a, and open flow channels which are non-closed on the exit side 11 form exit channels 6b. As a result of the exit-side closure of the entry channels 6a by a plug 8 in each case, exhaust entering the entry channels 6a flows through the porous channel walls 7, with particles contained in the exhaust being filtered out.

A catalytic effective coating 9 is preferably applied to the walls 7 of some or all of the flow channels 6a, 6b. In the case illustrated in FIG. 2, the catalytic coating 9 by way of example is provided merely on the walls 7 of the entry channels 6a. The catalytic coating 9 is preferably present continuously on the walls 7 of the corresponding flow channels, and is itself gas permeable. The catalytic coating 9 can be formed in the manner of a three way catalyst coating, an oxidation catalytically effective coating, an SCR catalyst that is selectively effective with regard to reduction of nitrogen oxides or in the manner of a nitrogen oxide storage catalyst coating in its respective usual meaning and form which are familiar to the person skilled in the art. In such case, radial layering of different coating forms may also be advantageous, which permits a combined effect. For example, a nitrogen oxide storage catalyst coating can be applied to an SCR catalyst coating, or conversely an SCR catalyst coating can be applied to a nitrogen oxide storage catalyst coating. A coating that is formed differently in sections in the axial direction is also possible. In this manner, an exhaust cleaning component with combined catalytic and filter-active function is formed.

It will be assumed below that a ready for use particle filter 5 which is brand new or freshly cleaned in an ash cleaning process is available. Furthermore, it is assumed that the particle filter 5 in the existing new condition has a particle separation efficiency of less than 70% relative to the particle mass and/or the number of particles of the exhaust that is typically emitted by the combustion engine 1 and flows through the particle filter 5. It is, however, not unusual that still far lower separation efficiencies of 50% or less are present with a new particle filter after the conclusion of the manufacturing process. In these cases, the invention proves very particularly advantageous, since such low separation efficiencies result in an intolerably high particle emission at least at the beginning of use of the particle filter. In order to increase this separation efficiency that typically in the new condition is more or less greatly reduced compared with the necessary and desired value, a conditioning step is provided according to the invention. In the present case, the conditioning step takes place in that an exhaust having a particle content that is increased relative to the value normally present is temporarily supplied to the new particle filter 5, in the installed state of the combustion engine 1 illustrated in FIG. 1. Preferably, the particle content is increased by about two to five times relative to the normal value. In this case, the size distribution of the particles emitted by the combustion engine 1 is preferably substantially unchanged relative to the normal value. For this, the combustion engine 1 is temporarily operated in a particle rich combustion mode. The particle rich combustion operation is preferably maintained until the separation efficiency of the particle filter 5 has risen to a pre-settable value of more than 70%, preferably more than 90% and particularly preferably more than 97%. The corresponding necessary amount of time can be determined empirically in advance by tests and be set accordingly. The set amount of time can also be set by the mass of the particles filtered out by the particle filter 5. It is typically sufficient to perform the conditioning operation until about 0.1 g to 1.0 g particles per liter of particle filter volume are stored in the particle filter 5.

Once the desired separation efficiency has been reached owing to the exposure to comparatively particle rich exhaust, the exposure of the particle filter 5 to exhaust is preferably terminated. The conditioning step is thus concluded and the combustion engine 1 is operated normally again in subsequent operating phases. Provision may also be made, directly following the conditioning step or as soon as possible once the conditioning step has been concluded, to perform an enforced particle filter regeneration by thermal soot burn-off. As was established, even after thermal particle filter regeneration, in which the particles introduced into the particle filter 5 previously in the conditioning step substantially in the form of soot are removed again at least for the most part, the increased particle separation efficiency is at least approximately present.

The procedure described for conditioning the particle filter 5 can be carried out before delivering a brand new vehicle or a vehicle with a new particle filter which has been inserted for example by exchanging.

Preferably the conditioning is carried out in a workshop provided for this. Provision may also be made to perform the conditioning step directly following delivery of the vehicle in normal operation. This is preferably performed in automated manner by a sequence programmed by an engine control unit. Provision may be made to perform the conditioning step following the first start or one of the first starts of the combustion engine 1 once the vehicle has been delivered to the appropriate user. In such case, provision is preferably made to perform the conditioning step within as continuous as possible a distance traveled of approximately 10 km.

As is illustrated diagrammatically in FIG. 3, the conditioning step can also be carried out with a particle filter 5 connected to a particle generator 12 external to the vehicle. The particle generator 12 may, for example, be formed as a liquid, gas or solids burner or as a soot generator. Provision is preferably made to expose the particle filter 5 to particle-containing gas of the particle generator 12 in the new condition before installation in the vehicle. The particle generator preferably supplies a particle-containing gas with a particle size range similar to that of a combustion engine, as explained above with reference to FIG. 1. The conditioning step is preferably carried out outside of the vehicle following the manufacturing process of the particle filter 5 or a cleaning process. The conditioning step is terminated analogously to above in a state of the particle filter installed in the vehicle, if the separation efficiency has risen to the desired value, or if an amount of particles sufficient for this is stored in the particle filter 5. In particular, in the case of exposure to soot particles, a regeneration operation with thermal soot burn-off may follow the conditioning step. The particle filter 5 which is thus pre-conditioned is then installed in the vehicle and the latter is handed over to its intended operation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for operating a particle filter that filters particles contained in exhaust of motor vehicle combustion engines, the method comprising:
    conditioning the particle filter in a new condition, such that a separation efficiency of the particle filter for particles is increased relative to a value existing in the new condition, wherein the conditioning includes one of
        modifying the engine operation for a pre-set initial running distance of the particle filter installed in the vehicle such that the exhaust emitted by the combustion engine has an increased particle content compared with normal operation, or
        connecting the particle filter to a conditioning device external to the vehicle and supplying, by the conditioning device, exhaust having an increased particle content compared with normal operation of the engine of the vehicle.

2. The method as claimed in claim 1, wherein the engine operation for performing the conditioning step is modified for a pre-set initial running distance of the particle filter installed in the vehicle such that the exhaust emitted by the combustion engine has a particle content of more than 0.01 g per m$^3$.

3. The method as claimed in claim 1, wherein the particle filter is installed in the vehicle; and the number or the timings of fuel injections, an exhaust recirculation rate, or a charging pressure of an exhaust turbocharger are modified for setting the increased particle content.

4. The method as claimed in claim 3, wherein when the particle filter is installed in the vehicle; and the conditioning step is carried out following a first start or one of the first starts of the combustion engine once the vehicle has been delivered to a user.

5. The method as claimed in claim 3, wherein the particle filter is installed in the vehicle; and the conditioning step is performed within a traveled distance of approximately 10 km.

6. The method as claimed in claim 3, wherein after performing the conditioning step, an amount of particles of more than 10 mg per liter of particle filter volume is filtered out from the particle filter and stored in the particle filter.

7. The method as claimed in claim 3, wherein the conditioning step is terminated if about 1 gram of particles per liter of particle filter volume is stored in the particle filter.

8. The method as claimed in claim 3, wherein after conclusion of the conditioning step, the separation efficiency of the particle filter is increased to more than 97%, relative to the particle mass or the number of particles of the filtering out of particles upon the intended normal use of the particle filter.

9. The method as claimed in claim 3, wherein upon performing the conditioning step particle-containing gas is passed through the particle filter for a pre-settable amount of time.

10. The method as claimed in claim 1, wherein the particle filter is installed in the vehicle; and the conditioning step is performed following a first start or one of the first starts of the combustion engine once the vehicle has been delivered to a user.

11. The method as claimed in claim 1, wherein the particle filter is installed in the vehicle; and the conditioning step is performed within a traveled distance of approximately 10 km.

12. The method as claimed in claim 1, wherein after performing the conditioning step, an amount of particles of more than 10 mg per liter of particle filter volume is filtered out from the particle filter and stored in the particle filter.

13. The method as claimed in claim 1, wherein the conditioning step is terminated if about 1 gram of particles per liter of particle filter volume is stored in the particle filter.

14. The method as claimed in claim 1, wherein after conclusion of the conditioning step, the separation efficiency of the particle filter is increased to more than 97%, relative to the particle mass or the number of particles of the filtering out of particles upon the intended normal use of the particle filter.

15. The method as claimed in claim 1, wherein upon performing the conditioning step particle-containing gas is passed through the particle filter for a pre-settable amount of time.

16. The method as claimed in claim 1, wherein the particle filter is connected to the conditioning device external to the vehicle; and wherein upon performing the conditioning step, the particle filter is arranged in an exhaust system of the vehicle.

17. The method as claimed in claim 16, wherein after performing the conditioning step, an amount of particles of more than 10 mg per liter of particle filter volume is filtered out from the particle filter and stored in the particle filter.

18. The method as claimed in claim 16, wherein the conditioning step is terminated if about 1 gram of particles per liter of particle filter volume is stored in the particle filter.

19. The method as claimed in claim 1, wherein the particle filter is connected to the conditioning device external to the vehicle; and wherein upon performing the conditioning step, the particle filter is arranged outside the vehicle.

20. The method as claimed in claim 19, wherein after performing the conditioning step, an amount of particles of more than 10 mg per liter of particle filter volume is filtered out from the particle filter and stored in the particle filter.

21. The method as claimed in claim 19, wherein the conditioning step is terminated if about 1 gram of particles per liter of particle filter volume is stored in the particle filter.

\* \* \* \* \*